United States Patent
West et al.

(10) Patent No.: US 8,727,667 B2
(45) Date of Patent: May 20, 2014

(54) VORTEX-INDUCED VIBRATION SUPPRESSION DEVICE AND MATING COLLAR SYSTEM

(75) Inventors: William Andrew West, Friendswood, TX (US); Donald Wayne Allen, Richmond, TX (US); Dean Leroy Henning, Richmond, TX (US)

(73) Assignee: VIV Solutions LLC, Richmond, TX (US)

( * ) Notice: Subject to any disclaimer, the term of this patent is extended or adjusted under 35 U.S.C. 154(b) by 227 days.

(21) Appl. No.: 13/368,241

(22) Filed: Feb. 7, 2012

(65) Prior Publication Data

US 2013/0039702 A1    Feb. 14, 2013

Related U.S. Application Data

(60) Provisional application No. 61/440,580, filed on Feb. 8, 2011.

(51) Int. Cl.
*F15D 1/10* (2006.01)
(52) U.S. Cl.
USPC ............................................ 405/216; 114/243
(58) Field of Classification Search
USPC ...................... 405/211, 212, 216; 114/243
See application file for complete search history.

(56) References Cited

U.S. PATENT DOCUMENTS

| | | | |
|---|---|---|---|
| 4,398,487 A | | 8/1983 | Ortloff et al. |
| 4,474,129 A | * | 10/1984 | Watkins et al. ............... 114/243 |
| 4,717,286 A | * | 1/1988 | Loer ................................ 405/74 |
| 5,722,340 A | * | 3/1998 | Sweetman ..................... 114/243 |
| 5,984,584 A | * | 11/1999 | McMillan et al. .......... 405/195.1 |
| 6,067,922 A | * | 5/2000 | Denison et al. ................ 114/243 |
| 8,500,367 B2 | * | 8/2013 | Somerville et al. ........... 405/216 |
| 8,523,492 B2 | * | 9/2013 | Baugh ............................ 405/211 |
| 2006/0021560 A1 | | 2/2006 | McMillan et al. |
| 2007/0104542 A1 | | 5/2007 | Somerville et al. |
| 2008/0025800 A1 | * | 1/2008 | Watkins ......................... 405/216 |
| 2010/0119308 A1 | * | 5/2010 | Somerville et al. ........... 405/216 |

FOREIGN PATENT DOCUMENTS

| | | |
|---|---|---|
| WO | WO-2007149770 | 12/2007 |
| WO | WO-2008008728 | 1/2008 |
| WO | WO-2009094355 | 7/2009 |

OTHER PUBLICATIONS

Viv Solutions LLC, PCT Search Report and Written Opinion mailed Jan. 30, 2013, PCT Appln. No. PCT/US2012/024329 filed Feb. 8, 2012.

* cited by examiner

*Primary Examiner* — Tara M. Pinnock
(74) *Attorney, Agent, or Firm* — Blakely Sokoloff Taylor & Zafman LLP

(57) ABSTRACT

A system including a votex-induced vibration (VIV) suppression device dimensioned to suppress a vortex induced vibration of a support structure, the VIV suppression device having a base portion that encircles at least a portion of the support structure and a support member formed along the base portion. The system further including a collar having a body portion defining an annular channel and a flange portion extending outwardly from the annular channel, the flange portion dimensioned to form a receiving channel around the support structure for receiving the support member. The support member is received within the receiving channel to secure the VIV suppression device to the support structure and the VIV suppression device is capable of rotating around the support structure along the receiving channel.

11 Claims, 11 Drawing Sheets

VORTEX-INDUCED VIBRATION SUPPRESSION DEVICE AND MATING COLLAR SYSTEM

CROSS-REFERENCE TO RELATED APPLICATION

The application is a non-provisional application of co-pending U.S. Provisional Patent Application No. 61/440,580, filed Feb. 8, 2011 and incorporated herein by reference.

FIELD

A VIV suppression device and mating collar system for supporting the VIV suppression device along a support structure.

BACKGROUND OF THE INVENTION

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. VIV suppression devices of a variety of sizes and shapes can be attached to the tubular to suppress these ocean current effects on the tubular. One such device is a helical strake, which consists of vanes that are wrapped in a helical pattern around the tubular. While helical strakes, if properly designed, can reduce the VIV fatigue damage rate of a tubular in an ocean current, they typically produce an increase in the drag on the tubular and hence an increase in deflection. Thus, helical strakes can be effective for solving the vibration problem at the expense of worsening the drag and deflection problem.

Another solution is to use fairings as the VIV suppression device. Typical fairings have a substantially triangular shape and work by streamlining the current flow past the tubular. A properly designed fairing can reduce both the VIV and the drag. Fairings are usually made to be free to weathervane around the tubular with changes in the ocean current. Fairings are usually designed with a specific chord-to-thickness ratio (chord divided by thickness), with the chord measured from the tip of the fairing nose to the tip of the fairing tail, and the thickness measured across the fairing normal to the flow direction, thus the chord is typically at least a little larger than the thickness.

One of the most important components of the overall system cost of fairings is the installation costs. For many applications, the cost of installation can exceed the cost of the fairing system hardware. In particular, drilling risers require fast installation times for fairings due to the very large cost associated with the drilling rig, where the rig is priced by the day. Fairing installation, however, can be time consuming, which in turn drives up costs.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION OF THE INVENTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1:
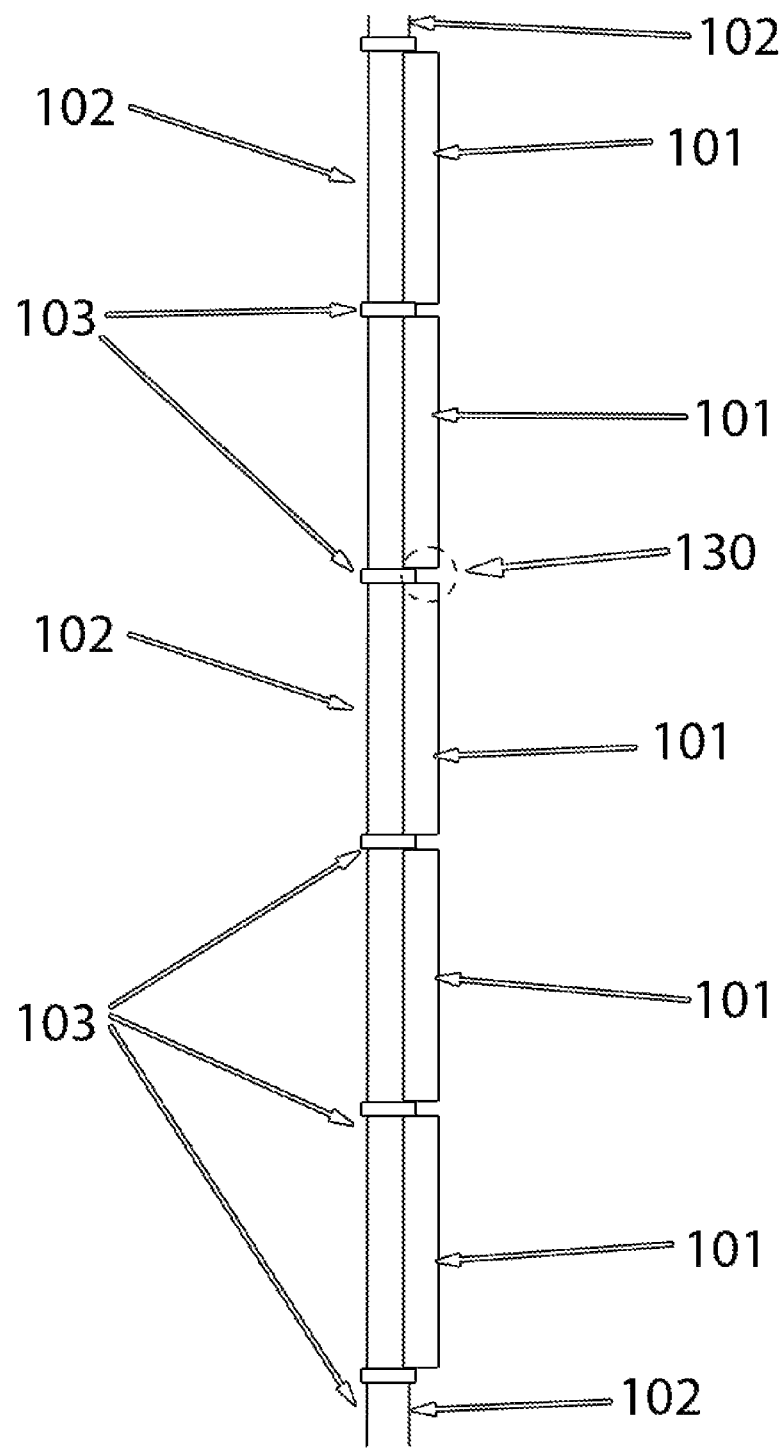
FIG. 1 illustrates a side view of one embodiment of VIV suppression devices and collars positioned around a support structure.

FIG. 1 illustrates a side view of one embodiment of VIV suppression devices and collars positioned around a support structure. VIV suppression devices 101 are positioned around support structure 102 and restrained axially by collars 103. Support structure 102 may be any structure that experiences VIV. Representatively, support structure 102 may be an underwater tubular structure. VIV suppression devices 101 may be any type of device suitable for suppressing VIV of support structure 102, for example, fairings. In some embodiments, the fairings are tail fairings that do not include a strap to attach the tail fairing to an underlying support structure. Alternatively, the fairings may be full fairings, meaning the fairing tail extends from a cylindrical body that wraps around tubular 102. Alternatively, each of VIV suppression devices 101 may be any type of suppression device that is positioned around tubular 102 and held in place axially using collars 103, for example, a tubular fairing, a helical strake or a VIV suppression device that encircles the underlying tubular and has other shapes and sizes (e.g. round, square, rectangular, etc). Each of VIV suppression devices 101 may be the same type of device or different types of devices. For example, they may be any combination of fairings and helical strakes.

Collars 103 are positioned between each of VIV suppression devices 101 to axially restrain VIV suppression devices 101 along support structure 102. In this aspect, collars 103 are of a size and dimension that allows them to be tightly secured around support structure 102 at a desired position. In one embodiment, collars 103 may be substantially cylindrical structures that have a clam shell type configuration that allows them to be opened and tightly closed around support structure 102 to hold them in place. In some embodiments, VIV suppression devices 101 may mate with collars 103 in a manner that axially restrains VIV suppression devices 101 along support structure 102 and holds VIV suppression devices 101 around support structure 102 while still allowing VIV suppression devices to rotate around support structure 102. Collars 103 and/or VIV suppression devices 101 may be dimensioned such that VIV suppression devices 101 weathervane around the entire circumference of support structure 102, only a portion of support structure 102, or, alternatively, do not weathervane at all. Since collars 103 mate with VIV suppression devices 101, a typical installation sequence along support structure 102 may include the installation of a collar 103, then the installation of a VIV suppression device 101, then the installation of a collar, etc. alternating between VIV suppression devices and collars.

VIV suppression devices 101 and collars 103 may be made of metal (such as stainless steel, copper, aluminum, INCONEL®, brass, or other metal), plastic (such as acrylonitrile butadiene styrene (ABS), polyvinyl chloride (PVC), polyethylene, or other plastic), wood, rubber (such as urethane), fiberglass, other composite, material, synthetic material, or any suitable material. VIV suppression devices 101 and collars 103 may be made of the same material or may be made of different materials. More than one material may be used in the construction of VIV suppression devices 101 and/or collars 103. VIV suppression devices 101 and collars 103 may be made by any suitable means including molding, forming, or the like.

In one embodiment, collars 103 mate with VIV suppression devices 101 through mating members on abutting sides of collars 103 and VIV suppression devices 101. Mating collars 103 with their respective VIV suppression devices 101 provides several installation advantages. In particular, as previously discussed, VIV suppression devices 101 may be tail fairings. Tail fairings are typically secured around the associated supported structure using one or more straps that attach to opposing sides of the tail fairing and wrap around the support structure. Installation of each tail fairing is time consuming because each strap must be secured to the fairing and around the support structure. For example, it can take on average 5-6 minutes to install a tail fairing around a support structure using a strap. By mating collars 103 with VIV suppression devices 101 (e.g. tail fairings), a strap or other securing mechanism that wraps around the support structure is no longer needed to secure the VIV suppression device around the support structure. In particular, the components disclosed herein allow for the installation of, for example, a tail fairing in approximately 1-2 minutes. Thus, significantly reducing installation time and, in turn, installation costs.

Figure 2:
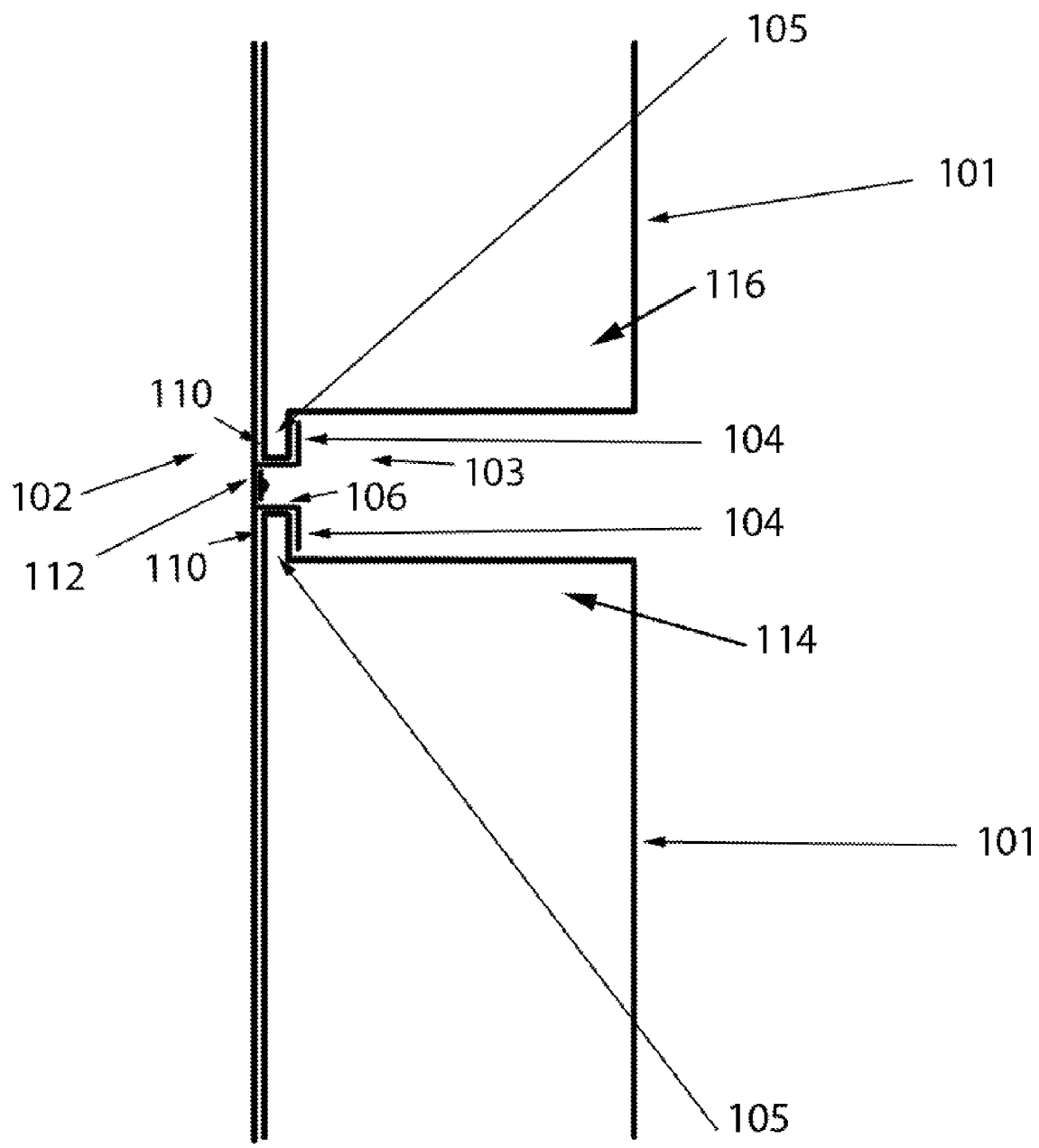
FIG. 2 illustrates a cross-sectional side view of one embodiment of VIV suppression devices and collars positioned around a support structure.

FIG. 2 illustrates an exploded cross sectional side view of a portion of a mating collar and VIV suppression device arrangement. The portion illustrated in FIG. 2 corresponds to portion 130 identified in FIG. 1 with dashed lines. From this view, it can be seen that collar 103 includes a body portion that defines annular channel 106 and flange portions 104 that extend outwardly from annular channel 106. Annular channel 106 may be dimensioned to receive strap or band 112 or other securing mechanism for securing collar 103 around support structure 102. In particular, strap 112 encircles collar 103 once it is positioned around support structure 102 and can be tightened so that collar 103 fits snuggly around support structure 102.

Flange portions 104 may be of any desired size and shape, and may be attached to collar 103 by any suitable means, including mechanical fastening, chemical bonding, welding, or clamping. It is important to note that collar 103 and one or more flange portions 104 may be of a single piece construction so that there is no need for an additional fastening means to fasten one or more flange portions 104 to collar 103.

Flange portions 104 may be substantially planar structures that extend outwardly from a side wall of annular channel 106. Flange portions 104 may extend from only one side of annular channel 106 or both sides of annular channel 106 such that flange portions 104 extend from both a top and bottom of collar 103. The terms top and bottom refer to opposing ends of the vertically aligned collar 103. For example, the top is the end of collar 103 facing the sky and the bottom is the end of collar 103 facing the sea floor, when collar 103 is positioned around support structure 102. Flange portions 104 may extend from the sidewall of annular channel 106 at an angle of approximately 90 degrees. In this aspect, flange portions 104 form an L-shaped structure with the sidewall of annular channel 106. Alternatively, flange portions 104 may have other shapes (e.g. a curved shape) and extend at other angles (e.g. less than 90 degrees) to accommodate other geometries of mating support members 105 extending from VIV suppression device 101. For example, flange portions 104 may have a shape such that they form a C-shaped, U-shaped, or V-shaped structure with the sidewall of annular channel 106. Support members 105 may be T-shaped or C-shaped, instead of rectangular as shown in FIG. 2. The above described configuration provides for fast installation. Note that it is possible to preinstall one or more components. It is also possible to install one or more support members 105 and/or one or more collar flange portions 104 during vessel installation of the system.

Flange portions 104 may form an annular receiving channel 110 around support structure 102 for receiving support member 105. Support member 105 may extend from one or both ends of VIV suppression devices 101. FIG. 2 illustrates support member 105 extending from a top end 114 of VIV suppression device 101 and another support member 105 extending from bottom end 116 of the abutting VIV suppression device. Receiving channel 110 may be of any size and shape suitable for receiving and mating with support member 105. Representatively, in embodiments where support member 105 is a substantially rectangular protrusion extending from an end of VIV suppression device 101 in an axial direction, receiving channel 110 may have a substantially rectangular or square cross-sectional dimension with an open end so that support member 105 can be inserted into receiving channel 110. Other sizes and shapes (e.g. C-shaped, U-shaped or V-shaped) may also be suitable so long as receiving channel 110 is capable of receiving and mating with support member 105.

Where VIV suppression device 101 includes support member 105 extending from both ends (see FIG. 7), both ends can be secured within receiving channel 110 of the respective adjacent collar 103. Since both the top and bottom ends of VIV suppression device 101 are inserted into receiving channel 110, VIV suppression device 101 is restrained from axial motion along support structure 102 while still allowing VIV suppression device 101 to weathervane around support structure 102 as support member 105 slides within receiving channel 110. In addition, receiving channel 110 formed by flange portions 104 prevents VIV suppression device 101 from being able to pull away normally from support structure 102. In this aspect, an additional securing mechanism (e.g. a strap, band or the like) is not needed to secure VIV suppression device 101 to support structure 102.

Flange portions 104 and support members 105 may be made of the same or different materials as each other and collar 103 and VIV suppression device 101, respectively. Representatively, flange portions 104 and support members 105 may be made of metal (such as stainless steel, copper, aluminum, INCONEL®, brass, or other metal), plastic (such as ABS, PVC, polyethylene, or other plastic), wood, rubber (such as urethane), fiberglass, other composite, material, synthetic material, or any suitable material. Still further, more than one material may be used in the construction of flange portions 104 and support members 105. Flange portions 104 and support members 105 may be made by any suitable means including molding, injection forming, or the like. Flange portions 104 and support members 105 may be integrally formed as a single unit with collar 103 and VIV suppression device 101, respectively, or separately formed and attached to the preformed structure, for example, by mounting or bolting the pieces together.

Figure 3:
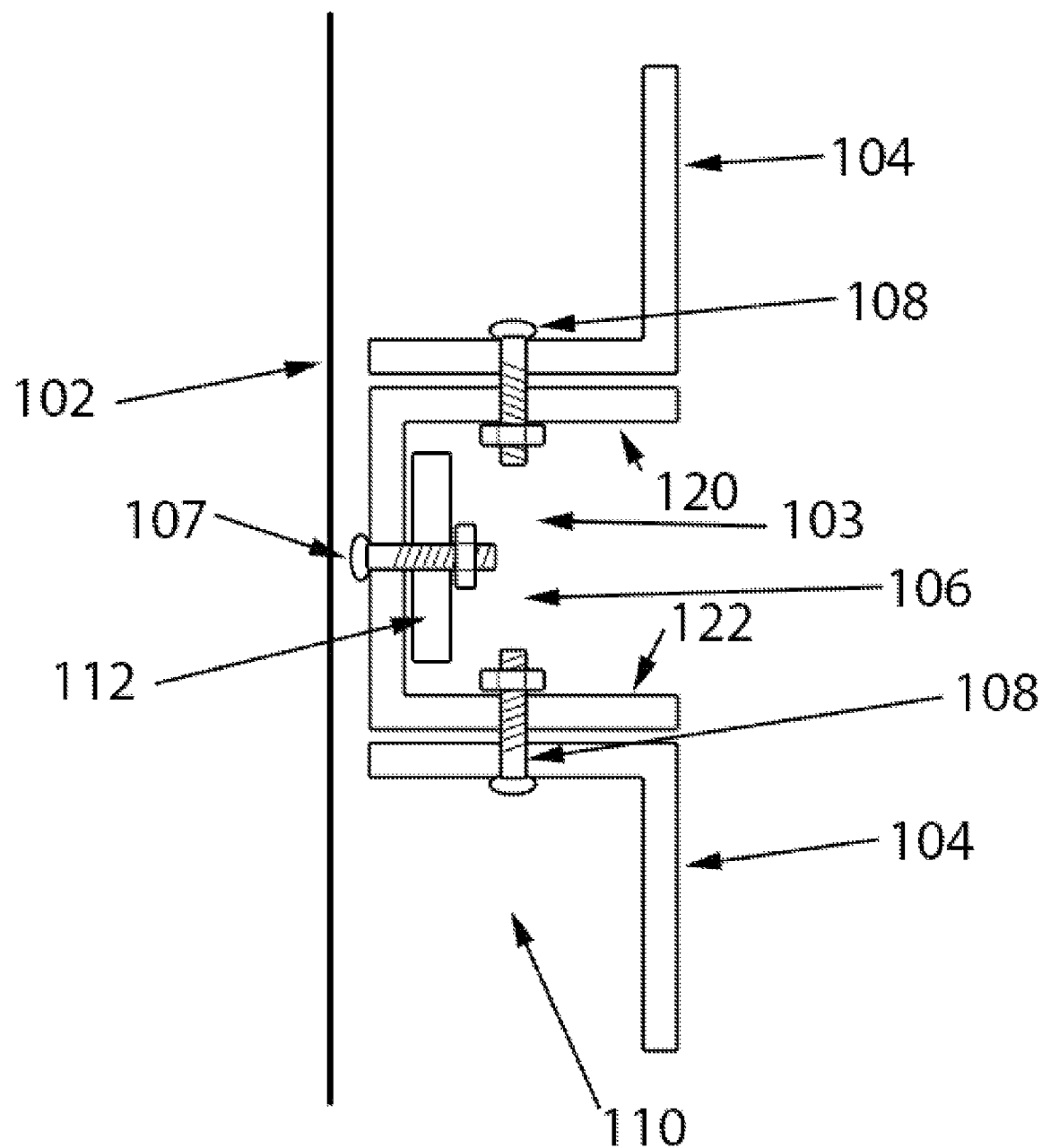
FIG. 3 illustrates a cross-sectional side view of one embodiment of a collar having flanges.

Representatively, as illustrated in the exploded cross-sectional side view of FIG. 3, in one embodiment, flange portions 104 are separate structures that are attached to a preformed substantially U-shaped collar 103. It is noted that similar to FIG. 2, the portion illustrated in FIG. 3 corresponds to portion 130 identified in FIG. 1 with dashed lines. Collar 103 is shown adjacent to support structure 102, and contacts support structure 102 once strap 112 is tightened around the circumference of support structure 102. Strap 112 is attached to collar 103 by fastener 107. Fastener 107 may be, for example, a bolt or other similar fastening mechanism. Strap 106 may, however, be attached to collar 103 by any suitable means, including mechanical fastening, banding, welding, chemical bonding, or by making strap 112 and collar 103 in a single piece. Alternatively, collar 103 may be tightened around support structure 102 by other means and strap 112 omitted. For example, collar 103 may be a clam shell structure having a spring and bolt mechanism that can be used to tighten the free ends together and accommodate variations in the diameter of support structure 102.

Flange portions 104 may have a substantially L-shaped profile and may be attached to sidewalls 120, 122 of collar 103 by any suitable fastening means 108, including mechanical fastening, banding, welding, chemical bonding. Alternatively, collar 103 and one or more collar flange portions 104 may be formed as a single integrally formed piece. Although L-shaped flange portions 104 are illustrated, as previously discussed, flange portions 104 may be of any desired geometry to accept a VIV suppression device and act to constrain the device while still allowing for rotation around the underlying support structure.

Fasteners 107 and 108 may be countersunk, but as noted above, other attaching mechanisms may be used. Fasteners 107 and 108 may be made of made of metal (such as stainless steel, copper, aluminum, INCONEL®, brass, or other metal), plastic (such as ABS, PVC, polyethylene, or other plastic), wood, rubber (such as urethane), fiberglass, other composite, material, synthetic material, or any suitable material. More than one material may be used to make each component, and they may, or may not, be made of the same material.

Figure 4:
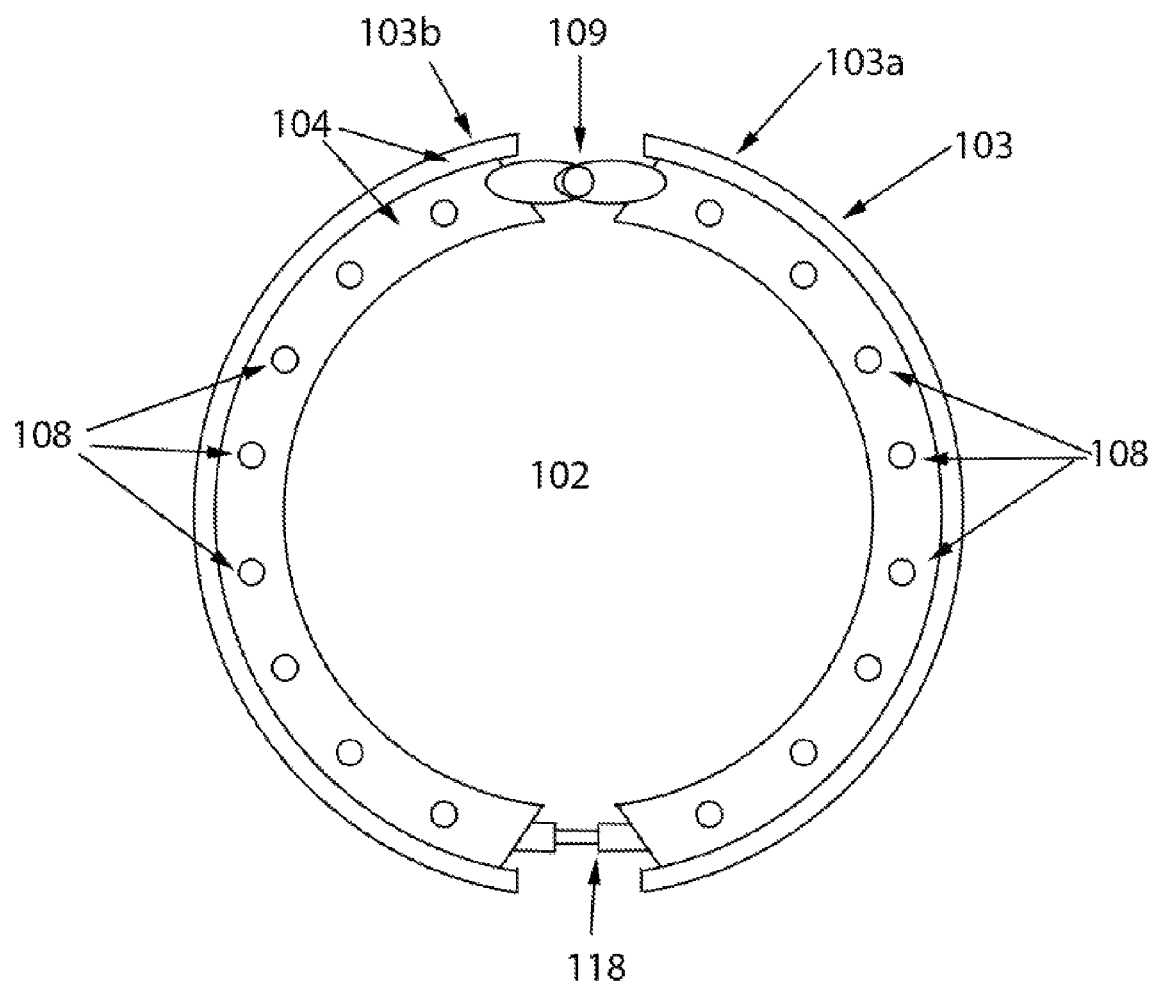
FIG. 4 illustrates a top view of one embodiment of a collar having flanges.

FIG. 4 illustrates a top view of one embodiment of a collar. Collar 103 is shown placed around support structure 102. Since flange portion 104 extends outwardly from a top and bottom portion of collar 103, only a top flange portion 104 can be seen from this view. In particular, it can be seen that in one embodiment, flange portion 104 is attached to the annular channel of collar 103 using fasteners 108. Collar 103 may be a clam shell type structure such that a first section 103*a* and second section 103*b* of collar 103 are movably attached together with optional hinge 109 at one side and collar fastener 118 at an opposite side. Hinge 109 and fastener 118 may be attached to abutting sections of flange portion 104 or the body portion of collar sections 103*a* and 103*b*.

Although fasteners 108 are illustrated, fasteners 108 may be replaced by other attachment methods, including other methods of mechanical fastening, banding, welding, chemical bonding, or by integrally forming collar 103 with flange portions 104 as a single piece. Hinge 109 is optional, but may be required if collar 103 is too stiff to be easily placed around the support structure 102. Hinge 109 may be constructed by any suitable method, including: termination of flange portion 104 in the hinge area so that the material stiffness is lower; thinning of the collar 103 and/or flange portion 104 material; use of a different material in the hinge area; or any other suitable hinges that are commercially available. More than one hinge may be used, and the collar 103 and flange portion 104 may be hinged differently, or in different locations. Collar fastener 118 may be replaced by other suitable means of fastening, including mechanical fastening methods, banding, welding, or chemical bonding. Collar fastener 118 may include spring mechanisms that assist in the accommodation of changes in the outside diameter of support structure 102.

Hinge 109 and collar fastener 118 may be made of metal (such as stainless steel, copper, aluminum, INCONEL®, brass, or other metal), plastic (such as ABS, PVC, polyethylene, or other plastic), wood, rubber (such as urethane), fiberglass, other composite, material, synthetic material, or any suitable material. More than one material may be used to make each component, and they may, or may not, be made of the same material.

Figure 5:
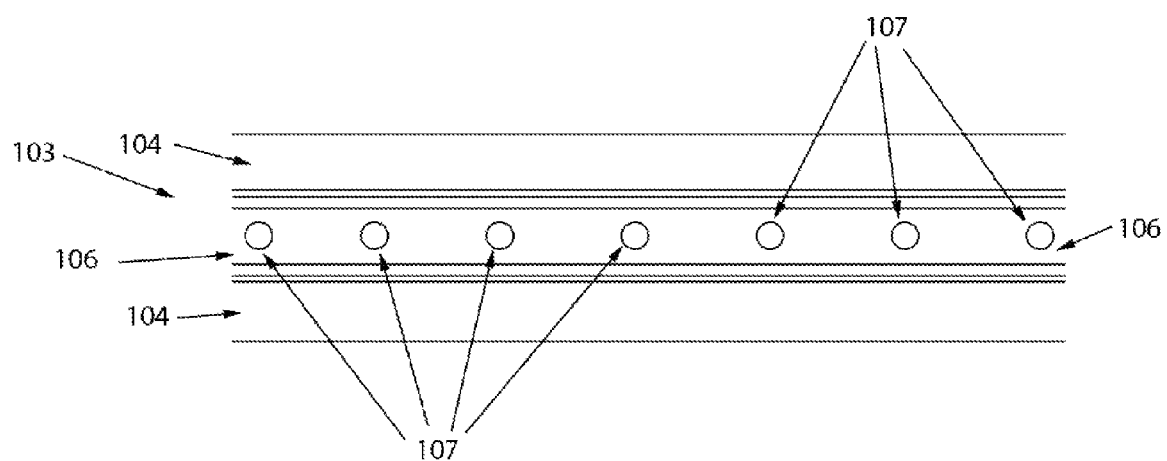
FIG. 5 illustrates a front view of one embodiment of a collar having flanges.

FIG. 5 illustrates a front view of one embodiment of a collar. From this view, it can be seen that flange portions 104 extend outwardly from both sides of annular channel 106 formed by the body portion of collar 103. Strap 106 is positioned within annular channel 106 and attached to collar 103 using fasteners 107. Strap 106 may act as a strength member for the overall collar 103, or may act as an anode, or any other desired function. Strap 106 may be attached to collar 103 by any suitable means, including mechanical fastening, banding, welding, chemical bonding, or by making strap 106 and collar 103 in a single piece. Similarly, flange portions 104 may be attached to collar 103 by any suitable means, including mechanical fastening, banding, welding, chemical bonding, or by making collar 103 and one or more flange portions 104 as a single piece.

Strap 106 may be made of metal (such as stainless steel, copper, aluminum, INCONEL®, brass, or other metal), plastic (such as ABS, PVC, polyethylene, or other plastic), wood, rubber (such as urethane), fiberglass, other composite, material, synthetic material, or any suitable material. More than one material may be used to make strap 106.

Figure 6:
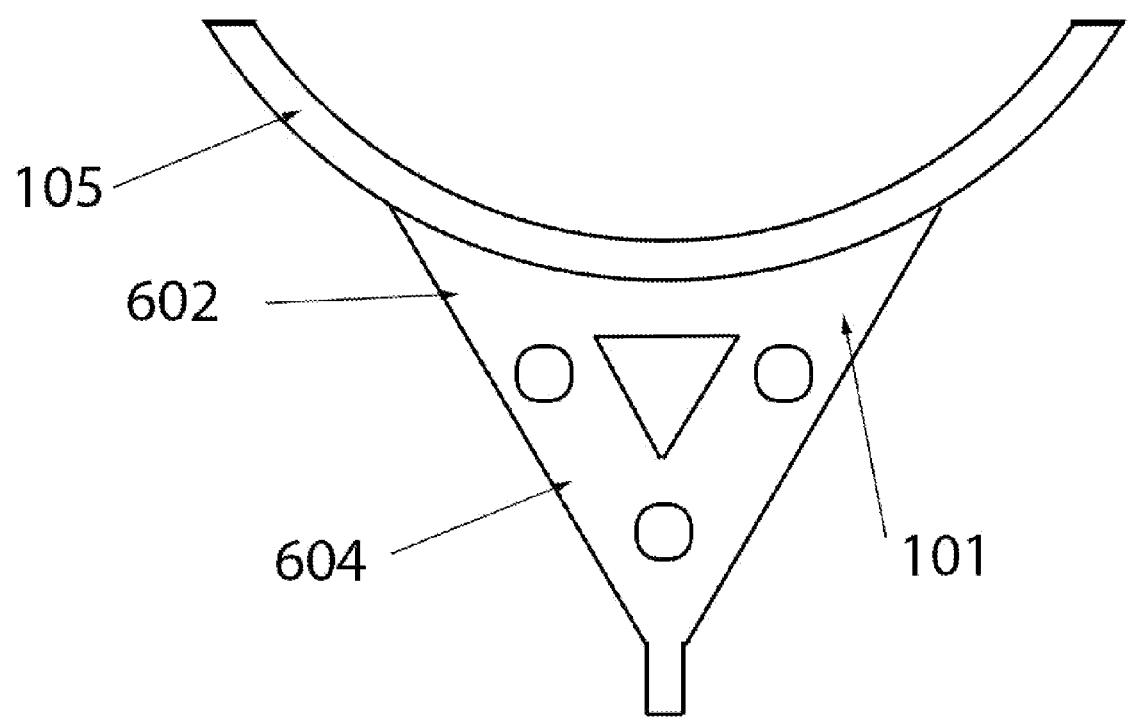
FIG. 6 illustrates a top view of one embodiment of a VIV suppression device having a support member.

FIG. 6 illustrates a top view of one embodiment of a VIV suppression device having support members. In this embodiment, VIV suppression device 101 is illustrated as a fairing having a tail portion 604 that extends from a base portion 602 that is positioned along the underlying support structure. Alternatively, a full fairing (i.e. a fairing having a tail portion extending from a body portion that encircles an underlying structure), or any other type of VIV suppression device that weathervanes about the underlying structure, such as a multi sided device (e.g square, rectangular, etc.), splitter plate(s), or other fairings (e.g. long chord fairing, perforated fairing, etc.).

As previously discussed, support member 105 extends in an axial direction from the top and bottom of VIV suppression device 101 so that it can be received within receiving channel 110 formed along the top and bottom ends of the abutting collar 103. From this view, it can be seen that support member 105 may also extend beyond the sides of base portion 602 if VIV suppression device 101 and curve around the underlying support structure 102. Representatively, support member 105 may be a single structure having a length greater than a width of body portion 602 such that when it is attached along the annulus of base portion 602, it extends beyond the opposing sides of body portion 602. In other embodiments, support member 105 may be two separate structures that are attached or formed at opposing sides of body portion 602.

Support member 105 can be rounded or curved similar to the outer surface of support structure 102 so as to facilitate rotation around the underlying support structure 102. Support member 105 may cover only a small portion, or it may cover a large portion, of the support structure circumference. Representatively, support member 105 may have a length that is length than the entire circumference of support structure 102 such that it encircles only a portion of support structure 102. Support member 105 may be made of one continuous integrally formed piece or separate sections.

Figure 7:
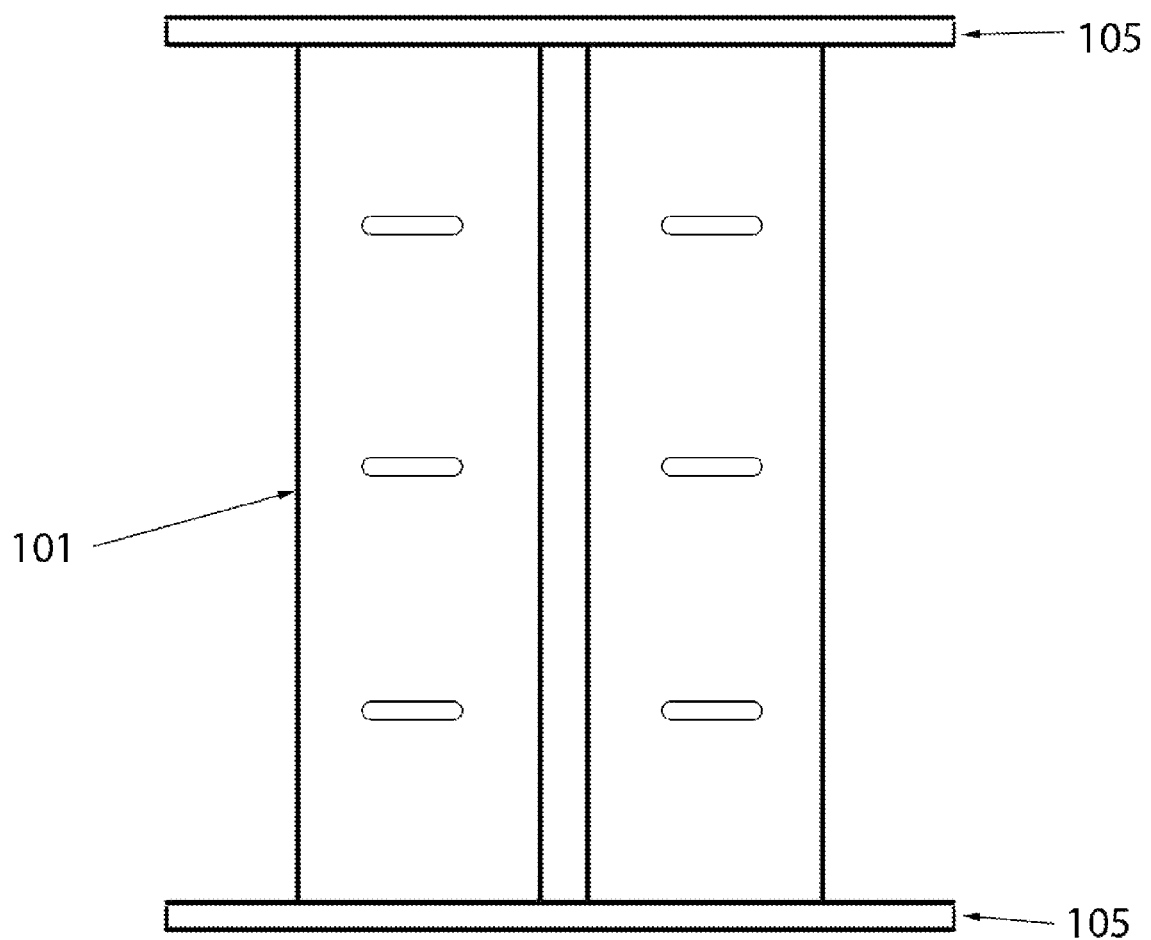
FIG. 7 illustrates a front view of one embodiment of a VIV suppression device having a support member.

FIG. 7 illustrates a front view of one embodiment of a VIV suppression device. From this view, it can be seen that support members 105 may have the same length such that they each cover the same portion of the underlying support structure circumference, or they may have different lengths such that they cover different portions of the support structure. Support members 105 may be identical in shape, material and construction, or they may be different in shape, material, and construction.

Figure 8:
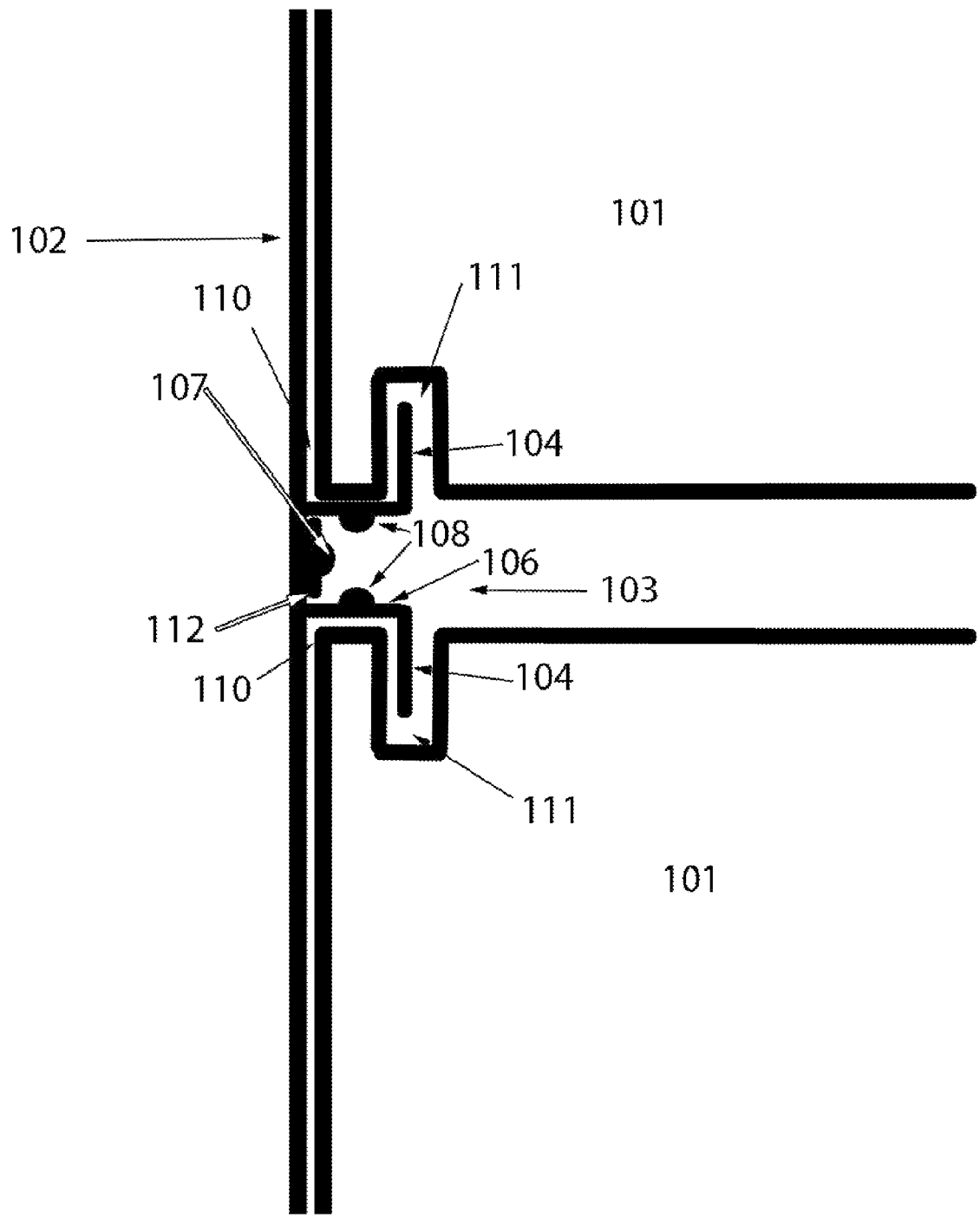
FIG. 8 illustrates a cross-sectional side view of another embodiment of a VIV suppression device and a collar.

FIG. 8 illustrates an exploded side cross-sectional view of another embodiment of a VIV suppression device and collar. It is noted that similar to FIG. 2, the portion illustrated in FIG. 8 corresponds to portion 130 identified in FIG. 1 with dashed lines. In this embodiment, collar 103 is adjacent to support structure 102. Strap 112 encircles collar 103 and is attached to collar 103 by fastener 107. Flange portions 104 extend outwardly from annular channel 106 formed by the body portion of collar 103. In one embodiment, flange portions 104 extend from, and are attached to, sidewalls of annular channel 106 by fasteners 108.

Similar to the previously described VIV suppression devices, VIV suppression devices 101 include support members 110 that are received within receiving channel 110 formed between flange portions 104 and support member 102. In this embodiment, however, support members 110 also form a portion of grooves 111 formed within the ends of VIV suppression devices 101. Flange portions 104 fit within grooves 111 and keep VIV suppression device 101 from being able to slide axially along support structure 102 or pull away normally from support structure 102. However, since flange potions 104 are positioned within respective grooves 111, VIV suppression devices 101 are able to slide around support structure 102 and weathervane with changes in current direction.

Since, in this embodiment, flange portions 104 serve as a male piece that mates with female piece, grooves 111, of VIV suppression devices 101, flange portions 104 may consist of other geometries such as an "I" cross section or a "T" cross section, or any other cross section that allows it to mate and interlock within grooves 111. Similarly, grooves 111 may be of any suitable shape or cross section that allows them to serve as the female piece in the interface with flange portions 104. For example, flange portions 104 may form a triangular structure with the outermost end being the wide portion of the triangle and grooves 111 may have a triangular cross-sectional shape complimentary to flange portions 104 such that flange portions 104 can interlock within grooves 111 and prevent VIV suppression devices 101 from pulling away from support structure 102. Flange portions 104 may be separate from collar 103, or one or more flange portions 104 and collar 103 may be of a single piece construction. Each of the flange portions 104 attached to collar 103 may be identical or they may be different in size, shape, geometry, attachment, material, or construction.

Grooves 111 may be constructed in any suitable manner, including molding grooves 111 into VIV suppression devices 101, or cutting VIV suppression devices 101 to form grooves 111 at each end. In some embodiments, grooves 111 may be substantially annular grooves having a curvature similar to that of support structure 102 so that they follow the curve of the base portion of VIV suppression devices 101. In this aspect, when flange portions 104 of the abutting collars 103 are inserted within grooves 111, VIV suppression devices 101 are able to rotate around collars 103 and the associated support structure 102.

Figure 9:
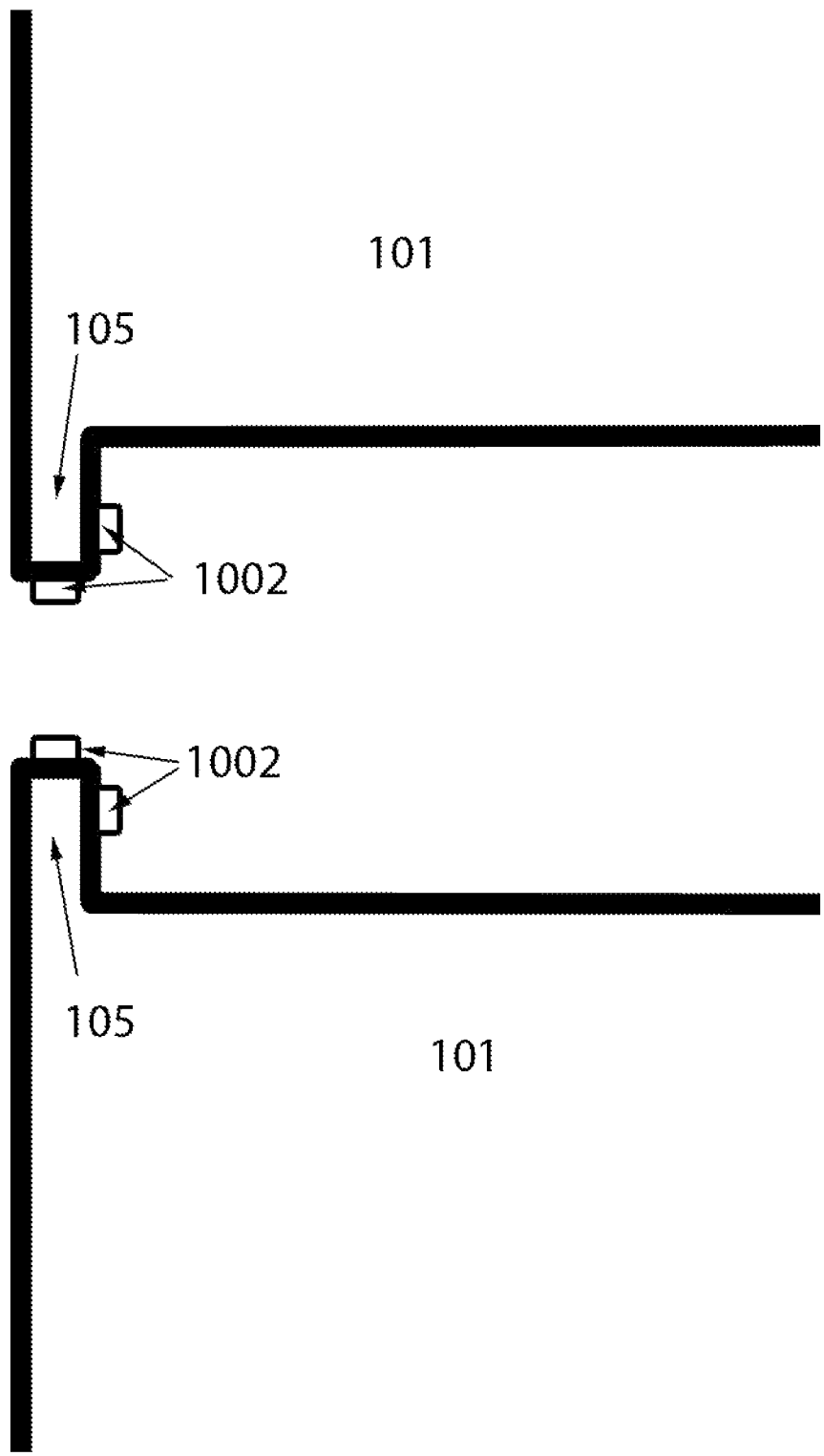
FIG. 9 illustrates a cross-sectional side view of a bottom end and a top end of one embodiment of adjacent VIV suppression devices having bearings.

FIG. 9 illustrates a cross-sectional side view of a bottom end and a top end of adjacent VIV suppression devices. VIV suppression devices 101 may be substantially similar to the previously discussed devices except in this embodiment, bearings 1002 are attached to support members 105. In one embodiment, bearings 1002 may be pads that provide a bearing surface between the support members 105 and the associated collar and flanges.

Figure 10:
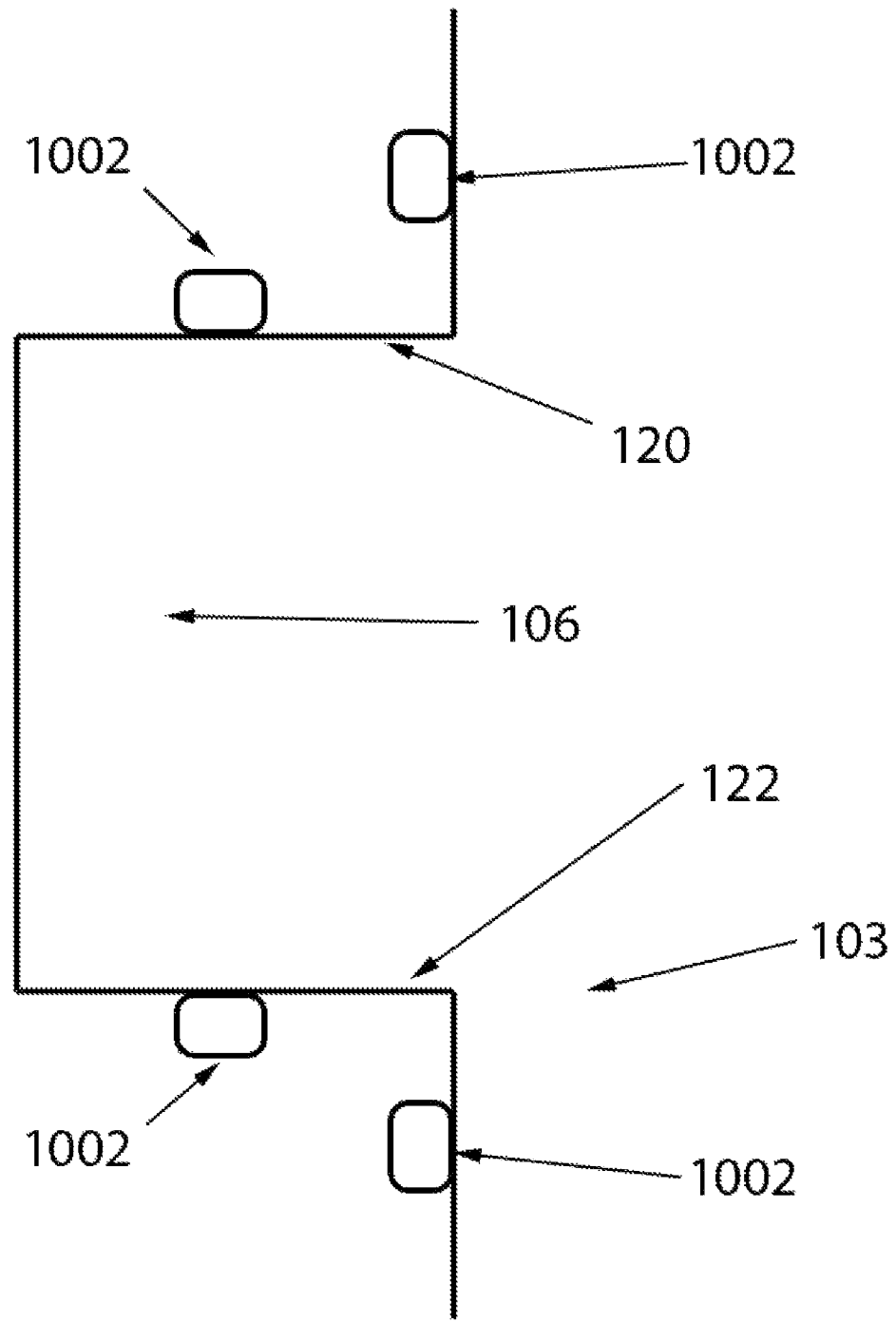
FIG. 10 illustrates a cross-sectional side view of one embodiment of a collar having a bearing.

Any number of bearings 1002 may be used. Representatively, in one embodiment, all of the interfacing surfaces between the collar flanges and the collar (or collar flanges) will have one or more bearings. Bearings 1002 may be located on support members 105, or in embodiments such as that of FIG. 8, within grooves 111 of VIV suppression devices. Additionally, or alternatively, bearings 1002 may be formed on portions of the associated collars contacting VIV suppression devices 101. For examples, as illustrated in FIG. 10, bearings 1002 may be provided on an outer surface of the collar flange or annular channel 106 that contacts support members 105 of VIV suppression devices 101.

Bearings 1002 may be of any size, shape, dimension and material suitable for minimizing the friction and/or minimizing any binding of VIV suppression devices 101 so that they are free to weathervane about an underlying structure with less friction or binding. Representatively, bearings 1002 may be made of metal (such as TEFLON®, stainless steel, copper, aluminum, INCONEL®, brass, or other metal), plastic (such as ABS, PVC, polyethylene, or other plastic), wood, rubber (such as urethane), fiberglass, other composite, material, synthetic material, or any suitable material. Coatings on the materials (such as TEFLON® coating) may also be used. More than one material may be used to make each of bearings 1002, and each of the bearings 1002 may, or may not, be made of the same material (i.e. one bearing may have one material composition, and another bearing may have the same, or a different material composition). Bearings 1002 may be attached to VIV suppression devices 101 or collar 103 by any suitable attachment means, for example, an adhesive, mechanical Bearings 1002 may be of any size, shape, dimension and material suitable for minimizing the friction and/or minimizing any binding of VIV suppression devices 101 so that they are free to weathervane about an underlying structure with less friction or binding. Representatively, bearings 1002 may be made of metal (such as TEFLON®, stainless steel, copper, aluminum, INCONEL®, brass, or other metal), plastic (such as ABS, PVC, polyethylene, or other plastic), wood, rubber (such as urethane), fiberglass, other composite, material, synthetic material, or any suitable material. Coatings on the materials (such as TEFLON® coating) may also be used. More than one material may be used to make each of bearings 1002, and each of the bearings 1002 may, or may not, be made of the same material (i.e. one bearing may have one material composition, and another bearing may have the same, or a different material composition). Bearings 1002 may be attached to VIV suppression devices 101 or collar 103 by any suitable attachment means, for example, an adhesive, mechanical attachment means (e.g. bolt) or chemical attachment means, or they may be integrally formed with VIV suppression devices 101 or collar 103.

Figure 11:
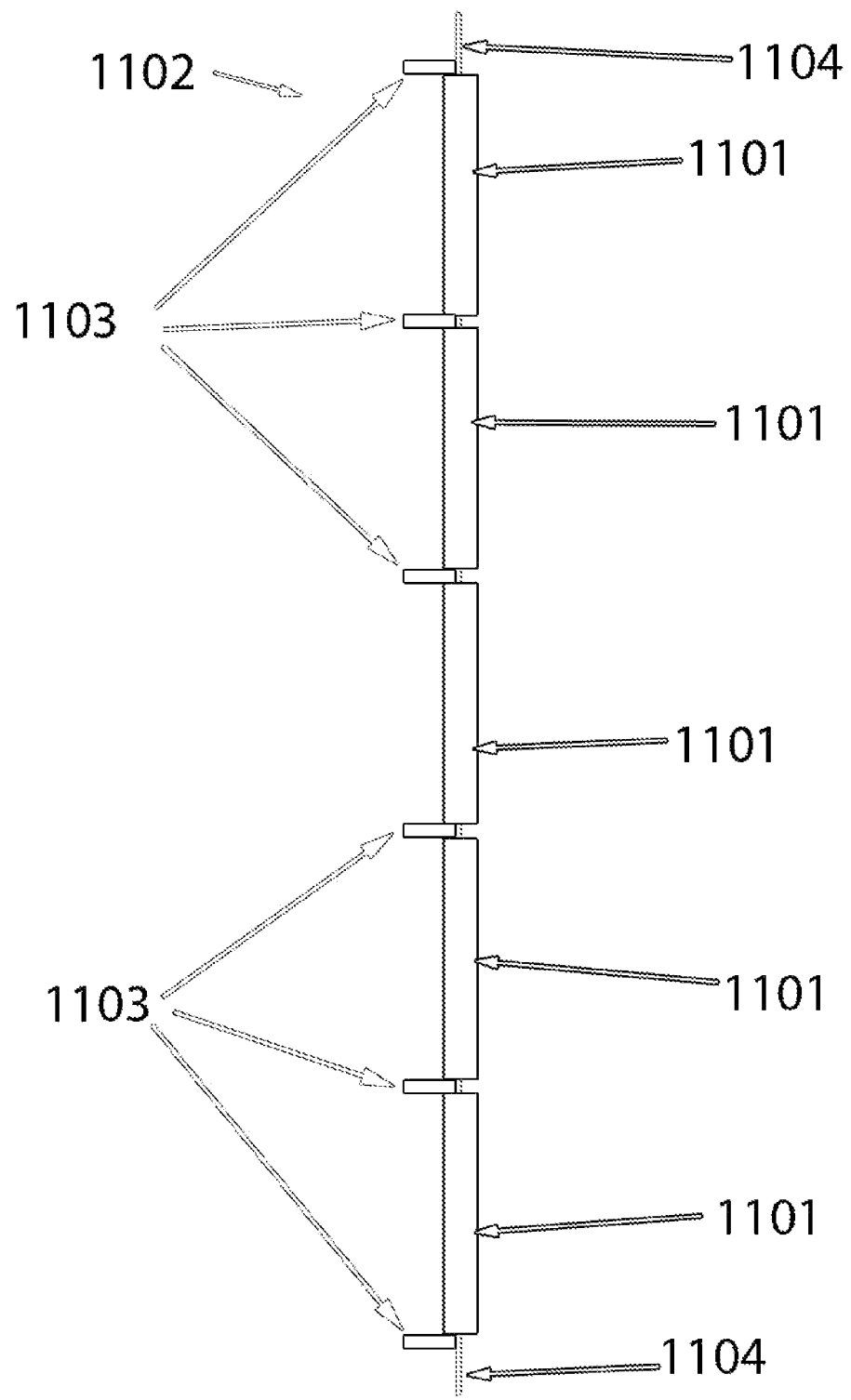
FIG. 11 illustrates a side view of an embodiment of an installation system for VIV suppression devices and collars.

FIG. 11 illustrates a side view of an embodiment of an installation system for VIV suppression devices and collars. VIV suppression devices 101 and collars 103 may be substantially similar to any of the previously discussed devices and collars. In one embodiment to facilitate underwater installation of the VIV suppression system 1102, VIV suppression devices 101 and collars 103 are mated with one another as previously discussed (e.g. by positioning collar flanges against the support members or grooves of the VIV suppression devices) and aligned along cable 1102. Cable 1104 may then be lowered into the water along the underwater support structure. Collars 103 may initially be in an open position such that once system 1102 is properly aligned along the underwater support structure, a diver, remotely operated vehicle (ROV) or other means may be used to clamp collars 103 around the support structure. Alternatively, collars 103 may be in a closed position such that they are opened and closed underwater. Since VIV suppression devices 101 are mated with collars 103, they are also attached to the support structure. Suppression system 1102 may be installed vertically or horizontally. In addition, various arrangements and substitutions may be made for cable 1104, and any number of VIV suppression devices 101 and collars 103 may be used. For example, collars 103 and VIV suppression devices 101 may be positioned along cable 1104 in the desired alignment (i.e. alternating collar 103 and devices 101) without mating them together. Once the cable 1104 is lowered into the water and aligned with the desired support structure, installation may include installing one of collars 103 around the support structure, mating the adjacent VIV suppression device 101 with the installed collar 103 and then installing and mating a second collar 103 at the other end of VIV suppression device 101.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the foregoing specification, the invention has been described with reference to specific embodiments thereof. It will, however, be evident that various modifications and changes can be made thereto without departing from the broader spirit and scope of the invention as set forth in the appended claims. Representatively, VIV suppression devices that utilize a flange or protrusion inserted into a portion of a collar such that the device is held against the underlying support structure such as a tubular and is free to weathervane around the tubular are described. It is contemplated, however, than any type of mechanism for mating a VIV suppression device to a collar that prevents the VIV suppression device from pulling away from the support structure and allows the VIV suppression device to slide around the collar may be used. For example, the VIV suppression device may be fixedly attached to a ring that rotates within the collar or rotatably attached to a ring that is fixed within the collar and/or the support structure. The specification and drawings are, accordingly, to be regarded in an illustrative rather than a restrictive sense.

What is claimed is:

1. An apparatus comprising:
  a vortex-induced vibration (VIV) suppression device dimensioned to suppress a vortex-induced vibration of a support structure, the VIV suppression device having a base portion dimensioned to encircle, and operable to be coupled to, at least a portion of a support structure; and
  a support member formed along an end of the base portion, wherein the support member extends from the end of the base portion in an axial direction and the support member is dimensioned to be received within a channel formed around a support structure to secure the VIV suppression device about the support structure.

2. The apparatus of claim 1 wherein the VIV suppression device is a strapless tail fairing.

3. The apparatus of claim 1 wherein the apparatus comprises a support structure and the channel is formed by a collar positioned around the support structure, and the support member defines a portion of a groove formed within the end of the base portion, wherein the groove is dimensioned to receive a portion of the collar to interlock the VIV suppression device with the collar.

4. The apparatus of claim 1 further comprising:
  a bearing formed along a surface of the support member to minimize frictional forces between the support member and the channel.

5. A system comprising:
  a vortex-induced vibration (VIW) suppression device dimensioned to suppress a vortex induced vibration of a support structure, the VIV suppression device having a base portion dimensioned to encircle, and operable to be coupled to, at least a portion of a support structure and a support member formed along the base portion; and
  a collar having a body portion defining an annular channel and a flange portion extending outwardly from the annular channel, the flange portion dimensioned to form a receiving channel around a support structure for receiving the support member,
  wherein when the support member is received within the receiving channel, the VIV suppression device is secured to a support structure and capable of rotating around the support structure along the receiving channel.

6. The system of claim 5 wherein the receiving channel comprises an L-shaped, a U-shaped or a C-shaped profile.

7. The system of claim 5 wherein the flange portion is a first flange portion and the receiving channel is a first receiving channel, the collar further comprising a second flange portion extending outwardly from an opposing side of the annular channel to form a second receiving channel between the collar and a support structure.

8. The system of claim 5 wherein the collar and the flange portion are a single integrally formed structure.

9. The system of claim 5 wherein the flange portion is attached to the annular channel by an attachment mechanism.

10. The system of claim 5 further comprising:
    a support structure; and
    a strap member dimensioned to fit within the annular channel and encircle the collar to hold the collar to the support structure.

11. The system of claim 5 further comprising:
    a support structure; and
    a cable attached to the VIV suppression device and the collar to facilitation installation of the VIV suppression device and the collar about the support structure, wherein the VIV suppression device and the collar are aligned along the cable prior to installation about the support structure and aligned with the support structure using the cable so that the VIV suppression device and collar can be attached to the support structure underwater.

\* \* \* \* \*

UNITED STATES PATENT AND TRADEMARK OFFICE
CERTIFICATE OF CORRECTION

PATENT NO. : 8,727,667 B2
APPLICATION NO. : 13/368241
DATED : May 20, 2014
INVENTOR(S) : West et al.

Page 1 of 1

It is certified that error appears in the above-identified patent and that said Letters Patent is hereby corrected as shown below:

In the Claims,

Column 10, Claim 5, line 52, please delete "VIW" and insert --VIV--.

Signed and Sealed this
Ninth Day of December, 2014

Michelle K. Lee
*Deputy Director of the United States Patent and Trademark Office*